United States Patent

[11] 3,620,841

[72] Inventors Richard Lawrence Comstock
San Jose;
Eugene B. Moore, Saratoga, both of Calif.
[21] Appl. No. 11,910
[22] Filed Feb. 16, 1970
[45] Patented Nov. 16, 1971
[73] Assignee International Business Machines Corporation
Armonk, N.Y.

[54] PROCESS FOR MAKING CONTINUOUS MAGNETITE FILMS
10 Claims, No Drawings

[52] U.S. Cl. .......... 117/237, 117/105.3, 117/12 H, 117/127, 117/235, 23/200, 252/62.56
[51] Int. Cl. .......... H01f 10/02
[50] Field of Search .......... 117/235, 237, 105.3, 124 A, 127, 130; 23/200; 252/62.56

[56] References Cited

UNITED STATES PATENTS 2,978,414 4/1961 Harz et al. .......... 117/235

FOREIGN PATENTS 1,121,826 7/1968 Great Britain
626,756 9/1961 Canada

OTHER REFERENCES

Kwiatkowski, Chemical Abstracts, Vol. 69, 1968 102690S

*Primary Examiner*—William D. Martin
*Assistant Examiner*—Bernard D. Pianalto
*Attorneys*—Hanifin and Jancin and Joseph G. Walsh

ABSTRACT: A continuous magnetite film, suitable for magnetic recording, is prepared by forming a film of amorphous $Fe_2O_3$, heating the $Fe_2O_3$ until it is completely converted to the alpha crystalline phase, and then reducing it to magnetite.

PROCESS FOR MAKING CONTINUOUS MAGNETITE FILMS

FIELD OF THE INVENTION

The present invention is concerned with the preparation of magnetite films. In particular, it is concerned with the preparation of continuous films having a high magnetic remanence and all other properties making them suitable for use as magnetic recording media with very high storage density.

PRIOR ART

Magnetite film recording media are mentioned by Ostertag et al. in IEEE Transactions on Magnetics Vol. Mag. 5, Page 327, Sept. 1969, but no method for their preparation is described, except the statement that some of them were obtained by controlled oxidation. To the best of our knowledge, all previous preparations of magnetite films have involved oxidation.

The kinetics of the reaction between hydrogen and bulk particles of $Fe_2O_3$ is described by van de Giessen et al. in IEEE Transactions on Magnetics Vol. Mag. 5, Page 317, Sept. 1969, but films of alpha phase crystalline $Fe_2O_3$ were not used as starting materials and no magnetite films were prepared.

It should be noted that alpha phase crystalline $Fe_2O_3$ is nonmagnetic and the prior art on the making of magnetic films teaches its avoidance, but it is, surprisingly, as essential intermediate in the present invention.

SUMMARY OF THE INVENTION

Magnetic surfaces for magnetic recording at higher density than current practice (2,000 flux changes per inch) must be thinner than 2.5 microns and, in contrast to currently used particle/binder coatings, they should be magnetically continuous. They must also have remanent magnetization in the range $4\pi M_S > 1{,}000$ G, and coercive field in the range $200 < H_c < 1{,}000$ Oe. For example, to record digital bits at 10,000 flux changes per inch (f.c.i.) with remanent magnetization $4\pi M_r = 4000$ G and $H_c = 400$ Oe, requires a coating thickness of 0.5 micron. Thinner metal films prepared by electroless deposition, e.g. NiCo–P, may satisfy these requirements, but these metals typically have poor wear characteristics. One solution to the wear problem is overcoating with a hard nonmagnetic metal, e.g. Cr, but this increases the critical head/recording surface spacing.

The present invention is a process for making thin (less than 2.5 microns, and preferably less than 1 micron) coatings of magnetite ($Fe_3O_4$) which have all of the characteristics necessary for high storage-density magnetic recording, including high wear resistance.

There are three steps to the process of the present invention. First, a film of amorphous $Fe_2O_3$is formed. There are several methods which may be used for this step. One preferred method is applying to the substrate ferric nitrate solution and spinning on a photoresist spinner. Upon heating, the ferric nitrate decomposes to form a film of amorphous $Fe_2O_3$.

In the second step of the process, the film of amorphous $Fe_2O_3$ is heated above about 300° C. until it has been completely crystallized to the alpha phase. This crystallization is a critical portion of the process. Only when the alpha crystalline phase is used as the starting material for the next step does the final product magnetite have the required high magnetic remanence. The explanation for this is not known, and the result was very unexpected.

In the third step of the process, the film of alpha phase $Fe_2O_3$ is reduced to magnetite, $Fe_3O_4$. This reduction may be accomplished in many ways, for example treatment with carbon monoxide or other reducing agents. The preferred method is treated with hydrogen gas, particularly hydrogen gas containing a small amount of water vapor. A feature of the present process which is particularly attractive is the relatively low temperature required to form the magnetite. Previously, when working with the oxidation type reactions, temperatures of 600°–1,000° C. were encountered. These high temperatures severely restrict the choice of substrate to be used because of: (1) mechanical distortions, (2) chemical reactions between film and substrate, (3) recrystallization and phase changes. The present invention overcomes these problems and has the advantage of being suitable for use on any of a wide variety of substrates. The substrate should be nonmagnetic and have a smooth surface. It should be chemically compatible with the film coatings. It should resist deformation. Titanium and titanium alloys have been outstanding substrates. Good results have been obtained with several varieties of glass. Aluminum is an attractive substrate for economical reasons. Various types of ceramics may also be useful. Alloys, such as nonmagnetic stainless steel, are suitable for use as the substrate.

Mechanical, thermal or chemical processes, or combinations thereof, are performed to prepare the surface of the chosen substrate for coating. With respect to the coating operation, the main requirement is that the surface be wetted by the diluted solution for generation of a smooth continuous film. Other surface requirements (surface finish, flatness, etc.) are dictated by the end usage. Except for cleaning, glass surfaces are usually ready for use without any other treatment. Metal surfaces are prepared by such methods as lapping, fine grinding with abrasive paper, metallographic polishing and diamond turning. Magnetic properties of the films have been found to be relatively insensitive to the type of substrate and to the surface preparation.

The films produced by the process of the present invention are randomly oriented, polycrystalline, continuous films of nominal $Fe_3O_4$ composition. The grain size has been determined microscopically to be 0.15 micron or smaller. Intrinsic surface finish (as obtained on glass substrates) is estimated to be about 0.02 micron peak to peak. Thickness uniformity has been found to be better than 5 percent over a linear dimension of several inches for the spinning technique.

The following examples are given to illustrate the preferred method of carrying out the invention. They are for purposes of illustration only, and are not to be deemed limitations of the invention, many variations of which are possible without departing from the spirit or scope thereof.

EXAMPLE I

Prepare a concentrated (10 molar) ferric nitrate stock solution using $Fe(NO_3)_3 \cdot 9H_2O$ and water. Dilute one part stock solution to two parts ethyl alcohol (denatured). Filter as required. (The use of ferric nitrate is a matter of convenience. The same result can be obtained by dissolving Fe, $Fe_2O_3$, etc. in nitric acid. Also, the concentration of the stock solution may be reduced as desired. A 10 molar solution yields about 0.1 micron per coat).

The substrate is held by a suitable rotating device and the diluted solution applied. A wet film is formed during rotation and is stabilized by evaporation of most of the alcohol. A very good practice is to use a photoresist spinner, apply two to 10 drops of solution (depending on size of substrate) to the center of the substrate, start spinner and spin for 15 seconds at 2,400–5,000 r.p.m. (depending on size of substrate).

Should visual observation reveal defects (particles, bubbles, etc.), the wet coating may be removed at this point with a solvent (alcohol, acetone, water, etc.) and a fresh coating applied.

Drying is achieved by heating the coating substrate in air to a suitable temperature. Our present practice employs a hot plate which is run through a timed cycle achieving 450°–500° C. maximum. As the film is heated, the last of the alcohol and the water is driven off. Further heating decomposes the nitrate, giving off nitric and nitrous oxides and leaving an amorphous solid with the composition $Fe_2O_3$. At temperatures of about 300° C. crystallization of alpha $Fe_2O_3$ begins and heating is continued to completely crystallize the film.

Additional coatings may now be applied, if desired, to build up thickness, since the solid $Fe_2O_3$ is relatively insoluble in the spinning solution.

The alpha $Fe_2O_3$ is reduced to magnetic $Fe_3O_4$ at elevated temperature in a suitable atmosphere. A very good practice employs hydrogen gas and is described by the reaction:

$$3Fe_2O_3+H_2 \rightarrow 2Fe_3O_4+H_2O$$

The temperature range used is 350°–450° C. In this temperature range, complete reduction to metallic iron is likely, and so to prevent this the hydrogen gas is bubbled through water such that the ratio $pH_2O/pH_2$ is approximately 0.025 in the furnace atmosphere. The time at temperature is 0.5–3 hours. X-ray diffraction analysis of a typical film detected only magnetite, $Fe_3O_4$, after this operation.

A time/temperature study of $Fe_3O_4$ film formation using hydrogen gas mixed with water vapor has been completed. With a room temperature dew point the degree of reduction of $2Fe_2O_3$ to $Fe_3O_4$ is strongly dependent on temperature in the range of 325°–400° C. The optimum was found to be between 350°–375° C. for 1 hour.

Two styles of furnaces have been used for this operation. A 2-inch tube furnace has been used for small test pieces, while the 3-inch disks have been treated in a box furnace with an Inconel muffle. Both furnaces provide positive control of gas purity and easy disposal of the flammable hydrogen.

EXAMPLE II

The following table shows physical properties of films prepared by the process of the present invention.

| Substrate | Film thickness, microns | Saturation magnetization ($4\pi Ms$), g. | Remanent: Ratio | Remanent: Magnetization, g. | Coercive field, oe. |
|---|---|---|---|---|---|
| Ti (6 Al, 4 V) | 0.66 | 844 | 0.59 | 497 | 240 |
| Al | 0.66 | 3,850 | 0.72 | 3,770 | 280 |
| Stainless steel | 0.66 | 4,200 | 0.74 | 3,100 | 380 |
| Ti (6 Al, 4 V) | 0.44 | 5,000 | 0.74 | 3,700 | 510 |
| Glass | 0.44 | 2,400 | 0.71 | 1,700 | 560 |
| Ti | 0.44 | 4,700 | 0.74 | 3,480 | 655 |
| Ti | 0.70 | 4,600 | 0.70 | 3,220 | 700 |
| Glass | 0.44 | 3,600 | 0.78 | 3,360 | 965 |
| Do | 0.66 | 6,000 | 0.74 | 4,400 | 310 |
| Do | 0.44 | 4,350 | 0.81 | 3,500 | 465 |

EXAMPLE III

Magnetic Recording 3-inch disks of magnetite on the titanium alloy substrate (90 percent Ti, 6 percent al., 4 percent V) have been prepared with an approximate 0.7 micron AA smoothness. With recordings made under the same conditions, we have discovered that the magnetite films result in a 100 percent increase in readback signal as compared with a commercially used $\gamma Fe_2O_3$/binder coating which is twice as thick. This 100 percent improvement was observed at recording densities greater than 2,000 flux changes per inch. At the recorded density at which the magnetite surface gave 100 percent larger amplitude than the conventional surface the peak shift of the recorded flux change was less than 1 percent, compared to 5 percent for the commercial surface.

Read/write tests on 3-inch disks are summarized in the following table:

| Film thickness, microns | $4\pi M_s$, g. | Remanence ratio | $4\pi M_r$, g. | $H_c$, oe. | Read-back amplitude (relative): 1,240 f.c.i. | Read-back amplitude (relative): 4,000 f.c.i. |
|---|---|---|---|---|---|---|
| 0.66 | 3,340 | 0.65 | 2,170 | 400 | 1.7 | 1.4 |
| 0.3 | 4,600 | 0.71 | 3,270 | 330 | 0.8 | 0.6 |

What is claimed is:

1. A process for making a continuous thin film having a high magnetic remanence and suitable for use as a high storage—density magnetic recording medium, said process comprising:
   a. forming a film of amorphous $Fe_2O_3$ of less than 2.5 microns thickness;
   b. heating the film of amorphous $Fe_2O_3$ above about 300° C. until it is completely converted to the alpha crystalline phase, and
   c. reducing the alpha phase $Fe_2O_3$ to magnetite.
2. A process as claimed in claim 1 wherein the amorphous $Fe_2O_3$ film is less than 1 micron thick.
3. A process as claimed in claim 1 wherein the amorphous $Fe_2O_3$ film is formed by a spinning technique.
4. A process as claimed in claim 1 wherein the reduction is carried out by reaction with hydrogen gas.
5. A process as claimed in claim 4 wherein the temperature during reduction is between 325° and 400° C.
6. A process as claimed in claim 4 wherein the hydrogen gas contains a small amount of water vapor.
7. A process as claimed in claim 1 wherein the film is deposited upon a nonmagnetic metallic substrate.
8. A process as claimed in claim 1 wherein the film is deposited upon a titanium substrate.
9. A process as claimed in claim 1 wherein the film is deposited upon an aluminum substrate.
10. A process as claimed in claim 1 wherein the film is deposited upon a glass substrate.